United States Patent

Hammer et al.

[11] Patent Number: 5,901,309
[45] Date of Patent: May 4, 1999

[54] METHOD FOR IMPROVED INTERRUPT HANDLING WITHIN A MICROPROCESSOR

[75] Inventors: Claes Hammer, Täby; Stefan Håkansson, Luleå, both of Sweden

[73] Assignee: Telefonaktiebolaget LM Ericsson (publ), Stockholm, Sweden

[21] Appl. No.: 08/946,639

[22] Filed: Oct. 7, 1997

[51] Int. Cl.[6] .................................................... G06F 9/46
[52] U.S. Cl. .................. 395/591; 395/800.4; 395/739
[58] Field of Search ................................ 395/734, 739, 395/742, 591, 387, 800.4, 800.38

[56] References Cited

U.S. PATENT DOCUMENTS

| | | | |
|---|---|---|---|
| 4,709,324 | 11/1987 | Klocker | 395/383 |
| 4,998,197 | 3/1991 | Kurakazu et al. | 395/568 |
| 5,115,506 | 5/1992 | Cohen et al. | 395/740 |
| 5,117,498 | 5/1992 | Miller et al. | |
| 5,155,853 | 10/1992 | Mitsuhira et al. | |
| 5,386,563 | 1/1995 | Thomas | 395/869 |
| 5,463,778 | 10/1995 | Johnson | 395/570 |
| 5,694,606 | 12/1997 | Fletcher et al. | 355/734 |
| 5,701,493 | 12/1997 | Jaggar | 395/734 |

FOREIGN PATENT DOCUMENTS

WO 93/01563  1/1993  WIPO .

OTHER PUBLICATIONS

Kloker, K.L., *"The Motorola DSP56000 Digital Signal Processor"*, IEEE Micro, vol. 6, No. 6, Dec. 1, 1986.

*Primary Examiner*—Larry D. Donaghue
*Attorney, Agent, or Firm*—Jenkens & Gilchrist, P.C.

[57] ABSTRACT

A method and apparatus for processing interrupts received by a processor during the processing of an instruction set by a processing pipeline is disclosed. Initially, an interrupt associated with an interrupt service routine is received during processing of the instruction set. In response to receipt of the interrupt, an interrupt instruction register is accessed containing at least one interrupt instruction associated with the interrupt service routine. The at least one interrupt instruction is inserted directly into the processing pipeline of the processor. The inserted instruction is then executed and control returns back to processing of the original instruction set after execution of at least one interrupt instruction.

14 Claims, 3 Drawing Sheets

METHOD FOR IMPROVED INTERRUPT HANDLING WITHIN A MICROPROCESSOR

BACKGROUND OF THE INVENTION

1. Technical Field of the Invention

The present invention relates to instruction processing by a microprocessor, and more particularly, to the processing of interrupts by a microprocessor.

2. Description of Related Art

Within most microprocessors, such as micro-controllers, digital signal processors, embedded CPUs, etc., the processing of a current task (instruction set) may be stopped to enable the execution of another task related to the current task in response to some external event. The external event is commonly called an interrupt to the microprocessor. The interrupt causes the microprocessor to branch to and begin processing an interrupt service routine consisting of a number of interrupt instructions. After completion of processing of the interrupt service routine, the processor switches back to the original task and resumes processing at the point that it was interrupted.

Processors usually employ a so called pipeline structure for the execution of an instruction set defining a task. A pipeline structure refers to the division of the execution of each instruction into several stages. These stages normally comprise a fetch, decode and execute stage. The fetch stage involves retrieving the instruction from memory for execution. The decode stage involves interpreting the instruction to decide what actions are to be taken, and the execution stage involves actually executing the determined actions.

Currently used methods for processing interrupts to a processor involve branching to a location in memory where the interrupt service routine is stored. Once execution of the interrupt service routine has been completed, a branch returns processing back to where the interrupt stopped processing on the previous task. Unfortunately, the process of branching to the set of instructions defining the interrupt service routine requires the use of overhead to process the interrupt. Overhead involves the execution of clock cycles by the processor where no instructions are actually executed. The branching process requires the execution of two unused clock cycles until the first instruction of the interrupt service routine is executed. Likewise, an overhead of two clock cycles is required to branch back from the interrupt service routine to the original instruction set. Thus, a total of four clock cycles would remain unused upon the execution of each interrupt service routine. If actual processing of the interrupt service routine required only one clock cycle (a single instruction) the overhead would be 400%. Thus, some means of more efficiently processing interrupt service routines that limits overhead generated by the procedure would greatly improve the utilization of processing resources.

Another disadvantage of current systems arises from the fixed location of the code needed to execute a specific interrupt service routine. If different actions must be taken for a specific interrupt service routine depending on when the interrupt is received, the program must introduce "if-then-else" portions within the interrupt service routine code or must change the contents of the program memory for the interrupt service routine to ensure a return to the correct location. The introduction of "if-then-else" portions wastes clock cycles and memory and is thus an unacceptable solution. The changing of the contents of the program memory is a risky and impracticable solution. The fixed locations in memory of the interrupt service routines also means that if one interrupt does not require all of the space reserved in memory for that interrupt, other interrupts may not utilize the unused memory. Thus, means for more efficiently utilizing the available memory resources within a processor with respect to interrupt service routines is also needed.

SUMMARY OF THE INVENTION

The present invention overcomes the foregoing and other problems with a system and method providing for improved processing of interrupts received by a processor during execution of an instruction set. Initially, while the processor is executing an instruction set through the processing pipeline, an interrupt is received that is associated with a particular interrupt service routine including at least one instruction.

In response to reception of the interrupt, the interrupt is examined to determine the contents of configuration fields within the interrupt. A first configuration field indicates whether the interrupt is to be processed using an interrupt instruction register or is to be processed according to a more conventional branch interrupt service procedure. A second configuration field denotes the address of the interrupt instruction register in the case of the interrupt to be processed by an interrupt instruction register, and a third configuration field indicates the number of instructions included within the interrupt service routine.

Using the information on the address of the interrupt instruction register, the identified register is accessed to extract the at least one interrupt instruction contained therein. This instruction is inserted directly into the processing pipeline of the processor. At the same time, the most recently fetched instruction within the processing pipeline is again fetched into or retained within the fetch stage of the processing pipeline. The inserted at least one interrupt instruction is executed, and the processor returns to processing the instruction set after execution of the at least one interrupt instruction.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
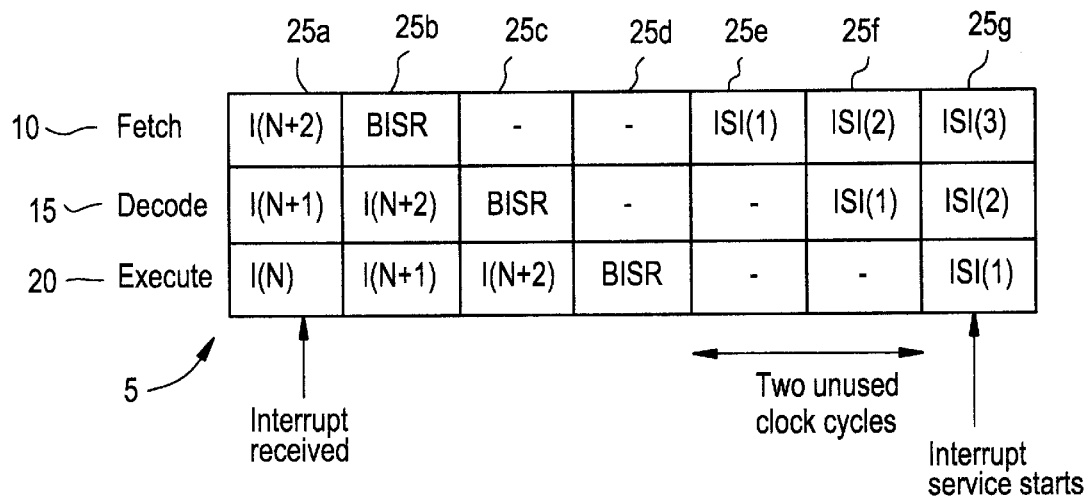
FIG. 1 is a diagram of a processing pipeline executing a branch to an interrupt service routine in accordance with the prior art.

Referring now to the Drawings, and more particularly to FIG. 1, there is illustrated the processing, in accordance with the prior art, of instructions by a microprocessor upon receipt of an interrupt. The interrupt causes processing to branch to an interrupt service routine. The instructions are processed through a processing pipeline 5. The processing pipeline 5 consist of a fetch stage 10, decode stage 15 and execute stage 20. These stages are aligned along the vertical axis of the processing pipeline 5.

The horizontal blocks represent clock cycles 25 executed by the microprocessor. An interrupt 30 is received during clock cycle 25a, while instruction I(N) is being executed and instruction I(N+2) is within the fetch stage of the pipeline 5. The received interrupt causes the processing of a "branch to interrupt service routine" (BISR) instruction within the pipeline 5 at clock cycle 25b. The BISR instruction cycles through the fetch 10 and decode 15 stages during clock cycles 25b and 25c until the execute stage 20 is reached. It should be noted that no instructions are inserted into the pipeline 5 behind the BISR instruction. When the BISR instruction reaches the execute stage 20 of the pipeline 5, processing branches to the interrupt service routine identified by the BISR instruction. The branching process requires an overhead of two unused clock cycles, namely, cycles 25e and 25f where no instructions are being executed.

Figure 2:
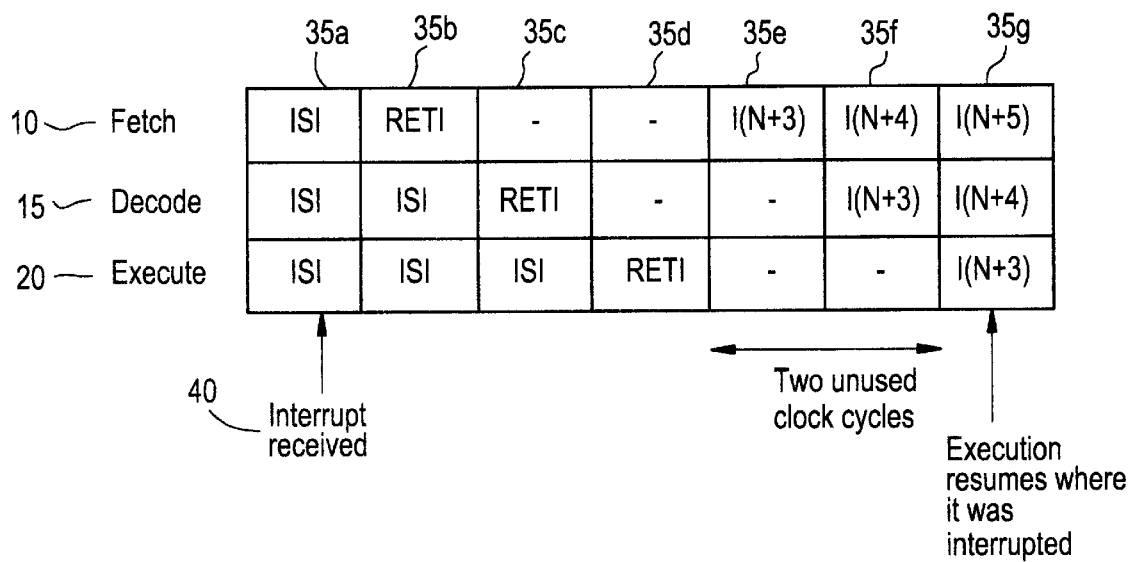
FIG. 2 is a diagram of a processing pipeline executing a return from an interrupt service routine in accordance with the prior art.

Referring now to FIG. 2, it can be seen that similar overhead requirements are needed when the interrupt service routine branches back to the original instruction set. During clock cycle 35a, a return from interrupt (RETI) instruction 40 is received to branch the interrupt service routine back to normal instruction set processing. The RETI instruction 40 is processed through the fetch 10 and decode 15 stages until the execution stage 20 is reached at cycle 35d. As before, no instructions are loaded behind the RETI instruction 40. As the normal processing instructions are retrieved for further processing at cycles 35e and 35f, these two clock cycles remain unused due to pipelining before the next instruction I(N+3) code is executed at the execution stage 20. This type of interrupt service routine processing wastes the clock cycles in which no instructions are executed. This causes an inefficient use of system resources and a slowing down of processing times.

Figure 3:
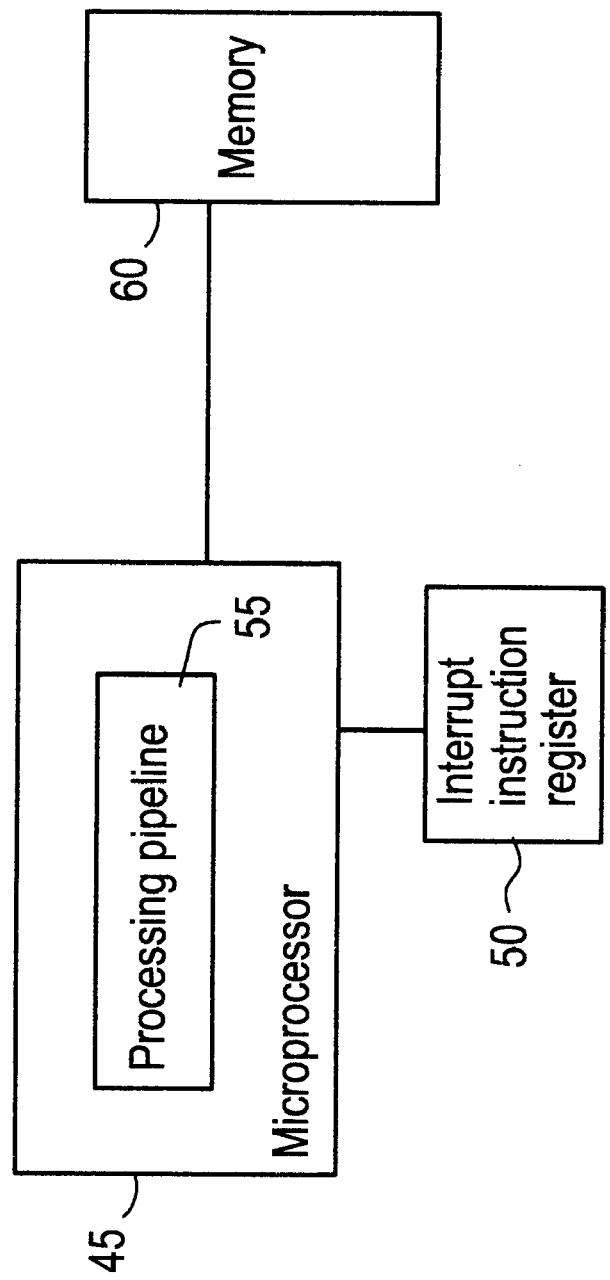
FIG. 3 is a functional block diagram of a microprocessor system including interrupt instruction registers.

Referring now to FIG. 3, there is illustrated a functional block diagram of a microprocessor 45 using interrupt instruction registers 50 in association with the processing pipeline 5 to improve interrupt processing by substantially eliminating overhead processing. While the following description is made with respect to the use of an interrupt register, it should be realized that a RAM, FLASH memory or like storage means may be used instead of a register. The microprocessor 45 utilizes interrupt instruction registers 50 which may insert instructions directly into the stages of the processing pipeline 5. This eliminates the need for the interrupt instructions to be fetched from memory 60, and enables processing to begin directly at the decode stage 15 (FIG. 4).

Figure 4:
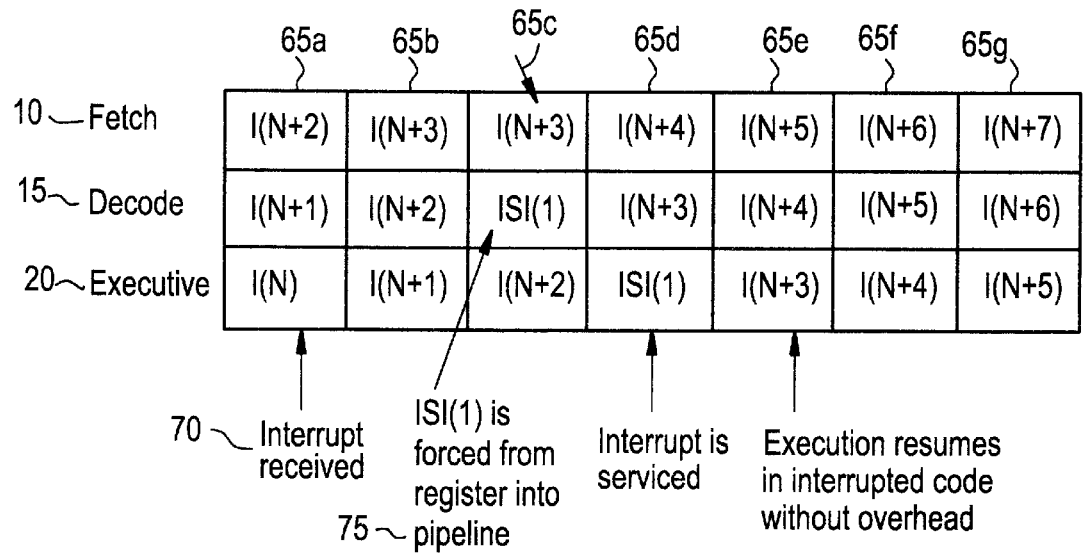
FIG. 4 is a diagram of an instruction pipeline executing an interrupt service routine using interrupt instruction registers.

Referring now to FIG. 4, there is more fully illustrated the processing pipeline 5 operating in association with interrupt instruction register 50. The processing pipeline 5 consist of the fetch 10, decode 15 and execute 20 stages as described previously. Execution of instructions through the pipeline 5 occur in response to each clock cycle 65 of the processor 45. During clock cycle 65a, an interrupt 70 is received by the processor 45 during execution of instruction I(N). The interrupt 70 is processed during the next clock cycle 65b to determine the configuration fields of the interrupt 70, as will be more fully discussed in a moment, and instructions continue to flow through the processing pipeline 5 in a normal fashion.

During clock cycle 65c, the first interrupt service instruction ISI(1) 75 is forced into the processing pipeline 5. In response to this forcing of ISI(1) into the decode stage 15, previously fetched instruction I(N+2) is again fetched from memory 60. Alternatively, the presently contained instruction I(N+2) may just be retained at its present location in the processing pipeline. The inserted interrupt service instruction ISI(1) is processed through the processing pipeline 5 and executed at the execution stage 20 during clock cycle 65d. It should be noted that an additional interrupt service instruction ISI(2) could be inserted into the processing pipeline at clock cycle 65d as is necessary to carry out all instructions necessary to complete an interrupt servicing routine. Should this occur, the instruction currently within the fetch stage 10 is again fetched until all instructions for completing the interrupt service routine are inserted into the processing pipeline 5. Once all necessary interrupt servicing instructions have been inserted within the processing pipeline 5 and executed at the execution stage 20, execution of a next instruction I(N+3) from the original instruction set resumes at cycle 65e. It can be seen that the processing of interrupts in this manner enables the execution of the interrupt service routine without the use of any overhead.

Figure 5A:
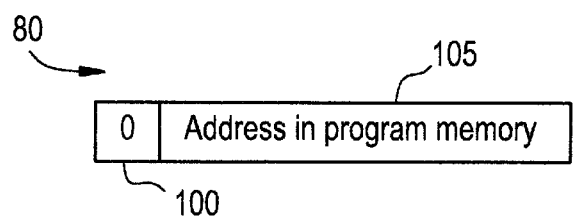
FIGS. 5a and 5b are diagrams of configuration fields for interrupts initiating access to an interrupt service routine.
Figure 5B:
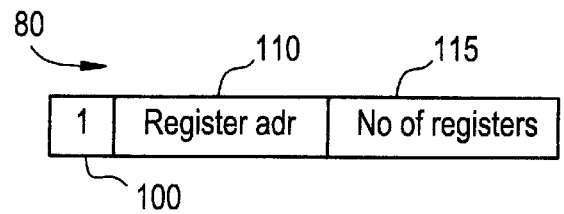

The interrupts received by the processing pipeline 5 may be configured to instruct the microprocessor 45 to process the interrupt according to a conventional interrupt branch routine or using interrupt instruction registers 50 by including a configuration field 80 with each interrupt. Referring now to FIGS. 5a and 5b, there are illustrated various configurations fields 80 for interrupts. FIG. 5a illustrate an interrupt configuration field 80 enabling processing of the interrupt according to a conventional interrupt branch routine. The identification bit 100 identifies whether the interrupt shall be serviced in the traditional way using an interrupt service routine stored in memory 60, or if the interrupt shall be served using an interrupt instruction register 50. If the identification bit 100 identifies execution of an interrupt service routine as shown in FIG. 5a, the memory address field 105 of the interrupt points to an address in memory 60 where the interrupt service routine begins. Alternatively, the second portion 105 may include part of an address to be combined with a page pointer.

Referring now to FIG. 5b, if the identification bit 100 indicates the interrupt shall be serviced by the interrupt instruction register 50, register address field 110 identifies the location of the register containing the first instruction to be executed. The number of registers field 115 indicates how many instructions must be fetched from the interrupt instruction registers to service the interrupt service routine associated with the interrupt.

Using these configuration fields 80 several different interrupts can share an interrupt service routine or interrupt instruction register 50. By associating each interrupt with a particular configuration field, the interrupt can be associated with one or several of the interrupt instruction registers 50 or with a selectable area in memory 60. Thus, the operation of the interrupt can be changed simply by altering the configuration fields 80 associated with the interrupt. Likewise, a new set of instructions or number of instructions may be indicated by altering the configuration of the interrupt. Furthermore, since the position in a memory 60 for an interrupt service routine is programmable, the positions for the routines can be optimized, thereby saving memory space.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for processing interrupts received by a processor processing an instruction set within a processing pipeline, comprising the steps of:

receiving an interrupt associated with an interrupt service routine including at least one interrupt instruction;

accessing an interrupt instruction register containing the at least one interrupt instruction;

inserting the at least one interrupt instruction of the interrupt service routine directly into the processing pipeline of the processor;

maintaining within the processing pipeline a last fetched instruction from the instruction set during insertion of the at least one interrupt instruction;

executing the at least one interrupt instruction of the interrupt service routine; and returning to processing of the instruction set after execution of the at least one interrupt instruction.

2. A method for processing interrupts received by a processor processing an instruction set within a processing pipeline, comprising the steps of:

receiving an interrupt associated with an interrupt service routine including at least one interrupt instruction;

accessing an interrupt instruction register containing the at least one interrupt instruction;

inserting the at least one interrupt instruction of the interrupt service routine directly into a decoding cycle of the processing pipeline of the processor;

executing the at least one interrupt instruction of the interrupt service routine; and returning to processing of the instruction set after execution of the at least one interrupt instruction.

3. The method of claim 2 wherein the step of accessing further includes the steps of:

reading a configuration field associated with the interrupt; and determining from a first portion of the configuration field if the interrupt is processed using the interrupt instruction register.

4. The method of claim 2 wherein the step of accessing further includes the steps of:

reading a configuration field associated with the interrupt; and determining from a second portion of the configuration field an address of the interrupt instruction register.

5. The method of claim 4 further including the step of determining from a third portion of the configuration field a number of interrupt instructions included in the interrupt service routine.

6. The method of claim 2 wherein the step of returning comprises processing the maintained instruction after execution of the at least one interrupt instruction.

7. A system for executing an instruction set, comprising:

a processing pipeline for fetching and executing the instruction set; and an interrupt instruction register responsive to receipt of an interrupt for inserting at least one interrupt instruction directly into a decoding cycle of the processing pipeline.

8. The system of claim 7 further including means for checking a configuration field of the interrupt to determine if the interrupt is to be processed using the interrupt instruction register.

9. The system of claim 7 further including means for checking a configuration field of the interrupt to determine an address of the interrupt instruction register.

10. The system of claim 7 further including a memory for storing a plurality of interrupt service routines accessible by the processing pipeline in response to receipt of an interrupt.

11. The system of claim 10 further including means for checking a selected portion of a configuration field of the interrupt to determine a location in memory for an interrupt service routine, the selected portion selectively programmable to a plurality of memory locations.

12. The system of claim 7 further including interrupts having selectively configurable configuration fields, the configuration fields including a selected portion indicating a location in memory for an interrupt service routine associated with the interrupt, the selected portion selectively programmable to a plurality of memory locations.

13. The system of claim 12 wherein the selected portion of the configuration field may direct multiple interrupts to the same memory location.

14. A system for executing an instruction set, comprising:

a processing pipeline for fetching and executing the instruction set;

an interrupt instruction register responsive to receipt of an interrupt for inserting at least one interrupt instruction directly into the processing pipeline; and means for checking a configuration field of the interrupt to determine a number of interrupt instructions to be inserted into the processing pipeline.

* * * * *

UNITED STATES PATENT AND TRADEMARK OFFICE
CERTIFICATE OF CORRECTION

PATENT NO    : 5,901,309
DATED        : May 4, 1999
INVENTOR(S)  : Claes Hammar et al.

It is certified that error appears in the above-identified patent and that said Letters Patent are hereby corrected as shown below:

Front Page, [75]     Replace "Hammer"
                         With --Hammar--

Signed and Sealed this

Seventeenth Day of April, 2001

Attest:

NICHOLAS P. GODICI

*Attesting Officer*     *Acting Director of the United States Patent and Trademark Office*